(12) United States Patent
Lu et al.

(10) Patent No.: US 9,766,904 B2
(45) Date of Patent: Sep. 19, 2017

(54) METHOD FOR DYNAMICALLY MODIFYING APPLICATION STARTUP ICON, MESSAGE SENDING METHOD AND TERMINAL

(71) Applicant: ZTE Corporation, Shenzhen (CN)

(72) Inventors: Tianwei Lu, Shenzhen (CN); Guang Fu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 191 days.

(21) Appl. No.: 14/436,266

(22) PCT Filed: Aug. 16, 2013

(86) PCT No.: PCT/CN2013/081609
§ 371 (c)(1),
(2) Date: Apr. 16, 2015

(87) PCT Pub. No.: WO2013/189341
PCT Pub. Date: Dec. 27, 2013

(65) Prior Publication Data
US 2015/0277938 A1      Oct. 1, 2015

(30) Foreign Application Priority Data

Oct. 22, 2012   (CN) .......................... 2012 1 0405575

(51) Int. Cl.
*G06F 9/44*      (2006.01)

(52) U.S. Cl.
CPC .......... *G06F 9/4443* (2013.01); *G06F 9/4401* (2013.01)

(58) Field of Classification Search
CPC ...................................................... G06F 9/4401
(Continued)

(56) References Cited

U.S. PATENT DOCUMENTS 6,466,241 B1 *  10/2002  Schindler .............. G06F 1/3215
                                                             348/E5.103
7,698,392 B2 *   4/2010  Zapata ..................... G06F 8/65
                                                                 709/220

(Continued)

FOREIGN PATENT DOCUMENTS

CN          1755612 A      4/2006
CN        101573946 A     11/2009
(Continued)

OTHER PUBLICATIONS

Supplementary European Search Report of EP 13806566, dated Nov. 6, 2015.

(Continued)

*Primary Examiner* — John Chavis
(74) *Attorney, Agent, or Firm* — Banner & Witcoff, Ltd.

(57) ABSTRACT

Disclosed are a method for dynamically modifying an application startup icon, a message sending method, a terminal and a server, wherein, the method for dynamically modifying an application startup icon includes: a terminal obtaining a command from a server, parsing the command to obtain an application package name, a new icon path and a text description on the new icon; the terminal creating a new icon according to the new icon path and the text description; the terminal using the new icon to create a startup icon of the application corresponding to the application package name on a home screen; and the terminal achieving a function of regularly flipping a tile by alternately replacing the startup icon.

18 Claims, 2 Drawing Sheets

(58) Field of Classification Search
USPC .......................................................... 717/168
See application file for complete search history.

(56) References Cited

U.S. PATENT DOCUMENTS

| | | | |
|---|---|---|---|
| 2002/0122076 A1* | 9/2002 | Nakaki | G06F 3/0481 715/847 |
| 2005/0268237 A1 | 12/2005 | Crane et al. | |
| 2006/0218528 A1* | 9/2006 | Lerner | G06F 8/60 717/120 |
| 2012/0260217 A1 | 10/2012 | Celebisoy | |

FOREIGN PATENT DOCUMENTS

| | | |
|---|---|---|
| CN | 102135874 A | 7/2011 |
| CN | 102681828 A | 9/2012 |

OTHER PUBLICATIONS

Ben Riga: "Live Tiles and Push Notification", Jun. 30, 2012, XP055226325, Microsoft TechEd 2012, retrieved from http://video.ch9.ms/teched/2012/eu/WPH 301.pptx, 38 pages.
Icon Variations Represent Properties of an Object, IBM Technical Disclsoure Bulletin, International Business Machines Corp. (Thornwood), U.S. vol. 33, No. 5, Oct. 1, 1990, 3 pages.
International Search Report of PCT/CN2013/081609 dated Nov. 28, 2013.
Chinese Office Action of Application No. 201210405575.2, dated Nov. 1, 2016.

* cited by examiner

METHOD FOR DYNAMICALLY MODIFYING APPLICATION STARTUP ICON, MESSAGE SENDING METHOD AND TERMINAL

TECHNICAL FIELD

The present document relates to the field of computer technology, and more particularly, to a method for dynamically modifying application startup icon, a message sending method, a terminal and a server.

BACKGROUND OF THE RELATED ART

In a mobile phone using Microsoft's windows phone operating system (WP7), "application program tile" is a tile created when a user drags the icon of an application program in the application program list to fix the application program to the "start" screen. Clicking the fixed application program tile will navigate the user to the opened page of the application program.

Starting from the Windows Phone OS 7.1, the tile becomes double-sided, and the information can be displayed by flipping between the front and the back.

The front of the tile has three attribute contents, as shown in FIG. 1, comprising: 1. title, which is a character string of the application program; 2. background picture, which displays an image on the tile; 3. count value, which is used for digital prompt.

The back (reverse side) of the tile also has three attribute contents, as shown in FIG. 2, comprising: 1. back title, which is a character string on the back and is relatively short; 2. back background picture, which displays an image on the back; 3. back content, which displays a character string of content displayed in the center of the back of the tile.

The six attributes of the front and back of the WP7 tile are separate, and it may individually have three attributes of the front or only the attribute of the front background picture. When both the front and the back are set with attributes, the tile is regularly flipped back and forth.

Wherein, the front and back background pictures can adopt pictures saved in a local independent storage space or pictures accessed by the network, and the size of the pictures can be stretched to 173×173 pixels during the use.

When a remote image is larger than 80 k or the downloading time is longer than 30 seconds, the downloading cannot be successful.

However, in an Android phone, due to the system differences, the Android phone does not support this function from the bottom layer, therefore the tile function does not appear in the Android phone, and the tile mechanism cannot be used to replace the icon so as to achieve the purpose of displaying information.

An Android widget in the Android phone is a small application program running on the Android desktop, and can display customized contents provided by the application on the desktop space specified by the user, which is similar to a desktop gadget on the PC.

The Widget is a feature added after the Android 1.5, and it allows a program to display some common and important information on the user's home interface (that is, desktop home screen).

Simply speaking, there are two points: firstly, it can be added on the home screen; secondly, the contents can be updated according to the time schedule. The above two points are completed with the support of the framework (AppWidget Framework) in the android system.

It can be seen from the Widget that, although there are many Widget updating mechanisms such as updating regularly, receiving broadcast updates, or directly modifying the Widget, all these, however, are for the Widget itself, and they do not work for most of the non-Widget programs already existing in today's application market.

Most of the programs in the Android phone are not Widget programs.

With regard to the WP7 tile technology, due to the system differences, the Android phone does not support this function from the bottom layer, therefore, the tile function does not appear in the Android phone, and we cannot use the tile mechanism to change the icon so as to achieve the purpose of displaying the information to the user, and what is solved in the present document is to achieve a function similar to the WP7 tile in the Android.

SUMMARY

The embodiment of the present document provides a method for dynamically modifying an application startup icon, a message sending method, a terminal and a server, to achieve a function similar to the WP7 tile in an Android phone.

The embodiment of the present document provides a method for dynamically modifying an application startup icon, and the method comprises:

a terminal obtaining a command from a server, parsing the command to obtain an application package name, a new icon path, and a text description on a new icon;

the terminal creating a new icon according to the new icon path and the text description;

the terminal using the new icon to create a startup icon of an application corresponding to the application packet name on a home screen; and the terminal achieving a function of regularly flipping a tile by alternately replacing the startup icon.

Preferably, the terminal obtaining a command from a server comprises:

the terminal receiving the command from the server through message pushing; or the terminal sending a request message to the server, and receiving the command returned by the server in accordance with the request message.

Preferably, the terminal creating a new icon according to the new icon path and the text description comprises:

the terminal directly creating a new icon according to the new icon path; or the terminal obtaining a new icon according to the new icon path, converting the new icon into a bitmap format, and adding the text description on the icon converted into the bitmap format; or the terminal remotely downloading a new icon according to the new path icon, saving the new icon as a local picture and then converting the picture into a bitmap format, and adding the text description on the icon converted into the bitmap format.

Preferably, the terminal using the new icon to create a startup icon of an application corresponding to the application packet name on a home screen comprises:

the terminal using the new icon in the bitmap format to change the startup icon of the application corresponding to the application package name or the application of itself.

Preferably, the terminal achieving a function of regularly flipping a tile by alternately replacing the startup icon comprises:

executing the operation of alternately replacing the startup icon by creating a timed task to simulate the flipping of front and back icons of the tile.

Preferably, the terminal is an Android-system terminal.

The embodiment of the present document further provides a message sending method, and the method comprises:

a server sending a command to a terminal, wherein the command carries an application package name corresponding to an icon to be changed, a new icon path and a text description on a new icon.

Preferably, a server sending a command to a terminal comprises:

the server actively sending the command to the terminal through message pushing; or the server receiving a request from the terminal, and sending the command to the terminal according to the request.

Preferably, the terminal is an Android-system terminal.

The embodiment of the present document further provides a terminal, and the terminal comprises:

a command obtaining module, which is configured to: obtain a command from a server, parse the command to obtain an application package name, a new icon path and a text description on a new icon;

a first creating module, which is configured to: create a new icon according to the new icon path and the text description obtained by the command obtaining module;

a second creating module, which is configured to: use the new icon created by the first creating module to create a startup icon of an application corresponding to the application package name on a home screen; and a replacing module, which is configured to: alternately replace the startup icon to achieve a function of regularly flipping a tile.

Preferably, the command obtaining module is configured to: receive a command from the server through message pushing; or, send a request message to the server, and receive the command returned by the server according to the request message.

Preferably, the first creating module is configured to:
directly create a new icon according to the new icon path; or obtain a new icon according to the new icon path, convert the new icon into a bitmap format, and add the text description on the icon converted into the bitmap format; or remotely download a new icon according to the new icon path, save the new icon as a local picture and convert the local picture into a bitmap format, and add the text description on the icon converted into the bitmap format.

Preferably, the second creating module is configured to: use the new icon in the bitmap format to replace the startup icon of the application corresponding to the application packet name or the application of itself.

Preferably, the replacing module is configured to: execute the operation of alternately replacing the startup icon by creating a timed task to simulate the flipping of front and back icons of the tile.

Preferably, the terminal is an Android-system terminal.

The embodiment of the present document further provides a server, and the server comprises:

a sending module, which is configured to: send a command to a terminal, wherein the command carries an application package name corresponding to an icon to be replaced, a new icon path and a text description on a new icon.

Preferably, the sending module is configured to:
actively send the command to the terminal through message pushing; or receive a request from the terminal, and send the command to the terminal according to the request.

Preferably, the terminal is an Android-system terminal.

The embodiment of the present document solves the problem that the startup icon used on the Home screen cannot be dynamically changed in the Android mobile phone system, and is able to dynamically display the icon to remind the user, while makes up for the deficiency that the Widget can be used only for a single application, and can modify icons of a plurality of applications simultaneously.

PREFERRED EMBODIMENTS OF THE INVENTION

Hereinafter in conjunction with the accompanying figures, the embodiments of the present document will be described in detail. It should be noted that in the case of no conflict, embodiments and features in the embodiments of the present application may be arbitrarily combined with each other.

The embodiment of the present document achieves the WP7 tile function in the Android system by modifying the startup icon of an application program; and discloses application-related information to the user by displaying different application icons at different times. Meanwhile, for the case that the usage mode of Widget is fixed and can be used only for a single application, it achieves the function of dynamically modifying the tiles of multiple specified applications.

Aiming at applications in the Android phone, the embodiment of the present document modifies the application icons on the Home screen through the codes in an Activity where the user interacts with the application program in the Android, a Service in the Android, or a class of BroadcastReceivers which filter, receive and respond notifications in the Android.

The embodiment of the present document provides a message sending method, and the method is described from a server side, and the method comprises:

a server sending a command to an Android-system terminal, wherein the command carries an application package name corresponding to an icon to be replaced, a new icon path and a text description on the new icon.

Wherein, the sending way can be message pushing, such as http requesting, broadcasting, SMS, and so on, and of course, the terminal may actively request to obtain the command. The sent content mainly comprises an application package name corresponding to an icon to be replaced, a new icon path (local path or external path) and a text description on the new icon, and so on.

Figure 1:
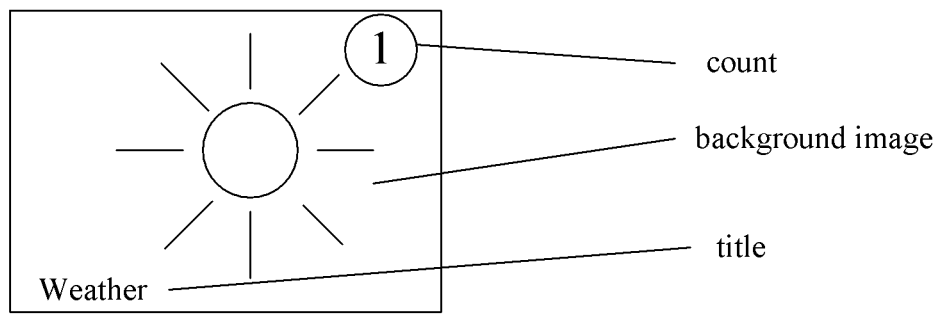
FIG. 1 is a schematic diagram of the front of a tile in the related art.
Figure 2:
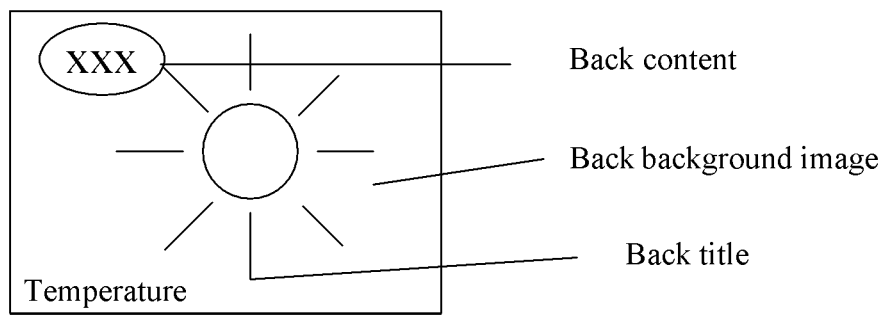
FIG. 2 is a schematic diagram of the back of a tile in the related art.
Figure 3:
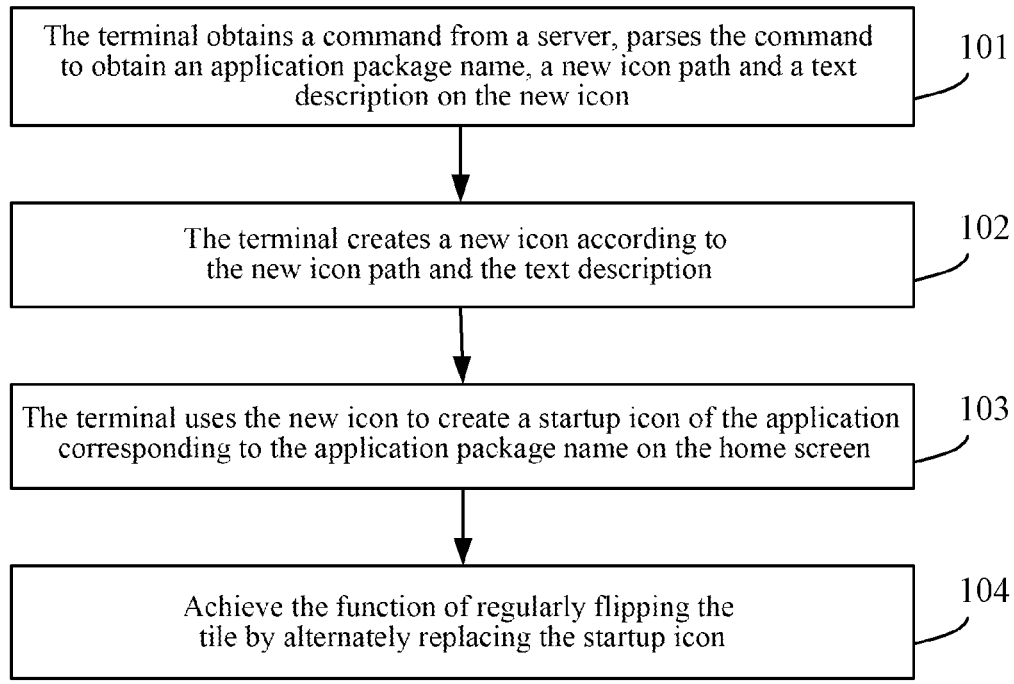
FIG. 3 is a flow chart of a method embodiment of dynamically modifying the icon in accordance with the present document.

Correspondingly, the embodiment of the present document further provides a method for dynamically modifying an icon, and the method will be described from a terminal side, and as shown in FIG. 3, the method comprises:

in step 101, the terminal obtains a command from a server, parses the command to obtain an application package name, a new icon path and a text description on the new icon;

the application package name, i.e. PackageName, is the name of the application process defined when creating the application, and corresponds to the application in the phone one-to-one. The application package name indicates modifying the startup icon of which application on the Home screen, and the new icon path indicates using what icon to replace the original old icon;

in step 102, the terminal creates a new icon according to the new icon path and the text description;

step 102 is divided into three cases:

A. the new icon is a resource picture, and this picture works as an icon file of a resource file saved in a program package during the application development, and it can be used directly without modification;

B. the new icon path is a local path, and it needs to convert the icon into a new icon of a bitmap type, such as a picture named 1.png stored in the phone SD card, to modify, and add a text description on the icon;

C. the new icon path is an external path (network path), the picture needs to be downloaded, and is generally downloaded using the HTTP GET mode, and then the picture is saved into a local path, such as /sdcard/1.png, and the operation is the same as that in the case B after saving the picture into the local path;

in step 103, the terminal uses the new icon to create a startup icon of the application corresponding to the application package name on the home screen;

wherein, the new Bitmap is used to create a startup icon of the specified application on the Home screen;

step 103 is also divided into two cases:

a. it is to use the new Bitmap to replace the startup icon of its own application;

this case is relatively simple, it is achieved according to the mode of creating a shortcut icon, if the original application already has a startup icon on the Home screen, the original application icon needs to be deleted first;

b. it is to use the new Bitmap to replace the startup icon of the specified application;

the deleting operation is the same as that in the case a, but the creating part needs to be modified.

Because the startup Activity of the specified application cannot be obtained and set through a simple statement "mainIntent.setClass (this, this.getClass ( ));", it needs to inquire to obtain the startup Activity of the specified application, and set it as the startup Activity of the ShortCut;

Under normal circumstances, its own application refers to: an application executing the code of creating a startup icon, and a specified application refers to: any other application having the Activity;

in step 104, it is to achieve the function of regularly flipping the tile by alternately replacing the startup icon.

In this step, the operation of replacing the icon can be executed by creating a timed task, to simulate the flipping of the front icon and the back icon, and the replacement time interval can be set as desired.

The terminal in the embodiment can be an Android-system terminal, and of course, it may also be a terminal using another system, such as a terminal compatible with the Android system or a terminal using an evolved version of the Android system.

Using the abovementioned method, it can achieve a function similar to the function of the tile in the WP7 system in the Android phone, and is able to achieve the purpose of dynamically replacing the startup icon by deleting the old icon on the Home screen and creating a new icon, and achieve the purpose of displaying the application information to the user through the selection of icon.

In the following, two local pictures being used to dynamically modify the icon of a specified application on the Home screen is taken as an example to describe the scheme in detail, and the process comprises:

in step 201, it is to create or make new icons according to the local pictures;

the step specifically comprises obtaining the Bitmaps of the pictures in the local directory; drawing a new canvas according to the Bitmaps; adding text information to the canvas; and ultimately obtaining a Bitmap with the canvas: NewIcon; the implementation codes are as follows:

//obtain Bitmaps of the pictures in the local directory
Bitmap bitmap=BitmapFactory.decodeFile("/sdcard/1.png");
Bitmap bitmap2=BitmapFactory.decodeFile("/sdcard/2.png");
//draw a new canvas according to the Bitmaps
Bitmap NewIcon=Bitmap.createBitmap(iconSize, iconSize, Config.ARGB_8888);
Canvas canvas=new Canvas(NewIcon);
int iconSize=getResources( ).getDimension(android.R.dimen.app_icon_size);
Paint iconPaint=new Paint( );
Rect src=new Rect(0, 0, bitmap.getWidth( ),bitmap.getHeight( ));
Rect dst=new Rect(0, 0, iconSize, iconSize);
canvas.drawBitmap(bitmap, src, dst, iconPaint);
//add text information on the canvas
Paint StrPaint=newPaint(Paint.ANTI_ALIAS_FLAG-|Paint.DEV_KERN_TEXT_FLAG);
StrPaint.setColor(Color.RED);
StrPaint.setTextSize(20f);
StrPaint.setTypeface(Typeface.DEFAULT BOLD);
canvas drawText ("front", iconSize-45, 20, StrPaint);
//ultimately obtain a Bitmap with the canvas: NewIcon,
in step 202, it is to use the new Bitmap to create a startup item of the specified application on the Home screen;

the step comprises deleting the previously existing startup item and creating a new startup item, specifically the implementation codes are as follows:

//delete the previously existing startup item
Intent shortcutIntent=new Intent("com.androidJauncher.action.UNINSTALL_SHORTCUT");
shortcutIntent.putExtra(Intent.EXTRA_SHORTCUT_NAME,
context.get String(R.string.app_name));
Intent mainIntent=new Intent(Intent.ACTION MAIN);
mainIntent.addCategory(Intent.CATEGORY LAUNCHER);
mainIntent.setClass(context, launcher ActivityClass);
shortcutIntent.putExtra(Intent.EXTRA_SHORTCUT_INTENT, mainIntent);
context.sendBroadcast(shortcutIntent);
//create a new startup item
Intent shortcutIntent=new Intent("com.android.launcher.action.INSTALL_SHORTCUT");
shortcutIntent.putExtra(Intent.EXTRA_SHORTCUT_NAME,
context.getString(R.string.app_name));

```
//set that creating multiple startup items is not allowed
    shortcutIntent.putExtra("duplicate", false);
//create a startup item on the Home screen
    Intent mainIntent=new Intent(Intent.ACTION_MAIN);
    mainIntent.addCategory(Intent.           CATEGORY_
LAUNCHER);
//Set the startup Activity
//Inquire the startup Activity of the application corre-
sponding to the specified package name pkg
    PackageManager        pkgMag=context.getPackage-
Manager( );
    Intent queryIntent=new Intent(Intent.ACTION_MAIN,
null);
    queryIntent.addCategory(Intent.           CATEGORY_
LAUNCHER);
    List<ResolveInfo>    list=pkgMag.queryIntentActivities
(queryIntent,
    PackageManager.GET_ACTIVITIES);
```

```
for (int i = 0; i < list.size( ); i++) {
ResolveInfo info = list.get(i);
    if (info.activityInfo.packageName.equals(pkg)) {
    title = info.loadLabel(pkgMag).toString( );
    mainAct = info.activityInfo. name;
    iconIdentifier = info.activityInfo.applicationInfo.icon;
    break;
    }
}
```

```
//Set the startup item to be the inquired Activity
    ComponentName    comp=new     ComponentName(pkg,
mainAct);
    shortcutIntent.putExtra(Intent.EXTRA_SHORT-
CUT_INTENT,new      Intent(Intent.ACTION_MAIN).set-
Component(comp));
//Set the new icon to be NewIcon
    shortcutIntent.putExtra(Intent.EXTRA_SHORTCUT_I-
CON, NewIcon);
    context.sendBroadcast(shortcutIntent);
    in step 203, it is to simulate the WP7 icon flipping
function through a timed task;
    the picture flipping interval can be set through the Sec-
ondNum, and the specific implementation codes are as
follows:
    mtimer=new Timer( );
    mtimer.scheduleAtFixedRate(new TimerTask( )
```

```
{
@Override
public void run( )
{
if (flag == true)
flag = false;
uninstallShortCut(frontIcon);
installShortCut(backIcon);
}
else
{
flag = true;
uninstallShortCut(backIcon);
install ShortCut(frontIcon);
}
}
}, 1000, 1000 * SecondNum);
```

It should be noted that, one skilled in the art can use a variety of codes to implement the corresponding function descriptions, and the codes used in the abovementioned embodiment are only one implementation;

in step 204, it is to solve the Toast (a message displaying mechanism in the Android) prompt problem in the reversing process.

It is found in the course of use that, every time an icon startup item of an application is deleted and created, the Toast message will be popped up, although it only exists for a few seconds, it will degrade the user experience. By modifying the following files InstallShortcutReceiver.java and UninstallShortcutReceiver.java in the Android source code whose path is packages\apps\Launcher2\src\com\android\launcher2, the Toast prompt message herein can be deleted, and the problem can be solved after recompiling the source code.

The codes that need to be deleted in the source codes are as follows:
    Toast.makeText(context,    context.getString(R.string.
shortcut_installed,   name),   Toast.LENGTH_SHORT).
show( );
    Toast.makeText(context,    context.getString(R.string.
shortcut_duplicate,   name),   Toast.LENGTH_SHORT).
show( );
    Toast.makeText(context,    context.getString(R.string.
out_of_space), Toast.LENGTH_SHORT).show( );
    Toast. makeText(context,    context.getString(R.string.
shortcut_uninstalled,
    name),Toast.LENGTH_SHORT).show( );

The icon update involved in the abovementioned embodiment does not conflict with the original program, and under the condition of not changing the original program, a variety of ways such as Activity, Service, broadcast notification can be used to modify the program icon, and the WP7 tile flipping function can be achieved through the codes.

In addition, the abovementioned method can be used to modify the icons of a plurality of specified applications simultaneously on the Home screen, which is different from the Widget.

Figure 4:
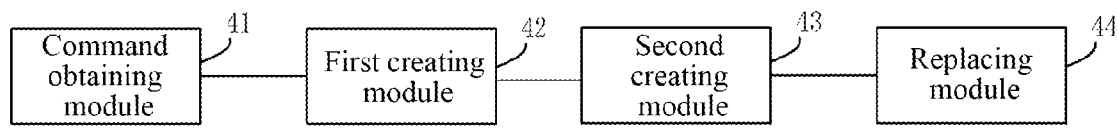
FIG. 4 is a schematic diagram of the structure of a terminal embodiment in accordance with the present document.

FIG. 4 is a schematic diagram of the structure of a terminal embodiment in accordance with the present document, and the terminal comprises:

a command obtaining module 41, which is configured to: obtain a command from a server, parse the command to obtain an application package name, a new icon path and a text description on the new icon;

a first creating module 42, which is configured to: create a new icon according to the new icon path and the text description obtained by the command obtaining module;

a second creating module 43, which is configured to: use the new icon created by the first creating module to create a startup icon of the application corresponding to the application package name on the home screen; and a replacing module 44, which is configured to: alternately replace the startup icon to achieve the function of regularly flipping the tile.

Wherein, the command obtaining module is configured to: receive a command from the server through message pushing; or, send a request message to the server, and receive the command returned by the server according to the request message.

Preferably, the first creating module is configured to:
    directly create a new icon according to the new icon path; or
    obtain a new icon according to the new icon path, convert the new icon into a bitmap format, and add the text description on the converted icon; or remotely download the new icon according to the new icon path, save the new icon as a local picture and convert it into the bitmap format, and add the text description on the converted icon.

Preferably, the second creating module is configured to: use the new icon in the bitmap format to replace the startup icon of the application corresponding to the application packet name or its own application.

Preferably, the replacing module is configured to: execute the operation of alternately replacing the startup icon by creating a timed task, to simulate the flipping of the front icon and the back icon of the tile.

The abovementioned terminal can be an Android-system terminal.

In the above description, it can dynamically change the startup icon of an application on the Home screen, can dynamically display to prompt the user, while make up for the deficiency that the Widget can be used only for a single application, and can modify the icons of a plurality of applications simultaneously.

Correspondingly, the embodiment of the present document further provides a server, and the server comprises:

a sending module, configured to: send a command to the terminal, wherein the command carries an application package name corresponding to the icon to be replaced, a new icon path and a text description on the new icon.

Wherein, the sending module is configured to: actively send the command to the terminal through message pushing; or, receive a request from the terminal, and send the command to the terminal according to the request.

In addition, the abovementioned terminal is an Android-system terminal.

The abovementioned server makes it possible for an Android-system terminal dynamically replacing the startup icon by interacting with the Android-system terminal.

Those ordinarily skilled in the art can understand that all or some of steps of the abovementioned method may be completed by the programs instructing the relevant hardware, and the abovementioned programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The present document is not limited to any specific form of the combination of hardware and software.

The above embodiments are merely provided for describing rather than limiting the technical scheme of the present document, and merely describe the present document in detail with reference to the preferred embodiments. A person of ordinary skill in the art should understand that, the technical scheme of the present document can be modified or or equivalently replaced, and any modifications and equivalent replacements made without departing from the spirit and scope of the technical scheme of the present document should be covered in the scope of the claims of the present document.

INDUSTRIAL APPLICABILITY

The embodiment of the present document solves the problem that the startup icon applied on the Home screen cannot be dynamically changed in the Android mobile phone system, and is able to dynamically display the icon to remind the user, while makes up for the deficiency that the Widget can be used only for a single application, and can modify icons of a plurality of applications simultaneously.

What is claimed is:

1. A method for dynamically modifying an application startup icon, wherein the method comprises:
   a terminal obtaining a command from a server, parsing the command to obtain an application package name, a new icon path, and a text description on a new icon;
   the terminal creating a new icon according to the new icon path and the text description;
   the terminal using the new icon to create a startup icon of an application corresponding to the application package name on a home screen; and
   the terminal achieving a function of regularly flipping a tile by alternately replacing the startup icon.

2. The method of claim 1, wherein:
   the terminal obtaining a command from a server comprises:
   the terminal receiving a command from the server through message pushing; or
   the terminal sending a request message to the server, and receiving a command returned by the server in accordance with the request message.

3. The method of claim 1, wherein:
   the terminal creating a new icon according to the new icon path and the text description comprises:
   the terminal directly creating a new icon according to the new icon path; or
   the terminal obtaining a new icon according to the new icon path, converting the new icon into a bitmap format, and adding the text description on the icon converted into the bitmap format; or
   the terminal remotely downloading a new icon according to the new path icon, saving the new icon as a local picture and then converting the picture into a bitmap format, and adding the text description on the icon converted into the bitmap format.

4. The method of claim 3, wherein:
   the terminal using the new icon to create a startup icon of an application corresponding to the application package name on a home screen comprises:
   the terminal using the new icon in the bitmap format to change the startup icon of the application corresponding to the application package name or the application of itself.

5. The method of claim 4, wherein:
   the terminal achieving a function of regularly flipping a tile by alternately replacing the startup icon comprises:
   executing the operation of alternately replacing the startup icon by creating a timed task to simulate the flipping of front and back icons of the tile.

6. The method of claim 1, wherein:
   the terminal is an Android-system terminal.

7. The method of claim 1,
   wherein the command carries an application package name corresponding to an icon to be changed, a new icon path and a text description on a new icon.

8. The method of claim 3, wherein:
   the terminal obtaining a command from a server comprises:
   the terminal receiving a command from the server through message pushing; or
   the terminal sending a request message to the server, and receiving a command returned by the server in accordance with the request message.

9. The method of claim 7, wherein:
   the terminal is an Android-system terminal.

10. A terminal, wherein the terminal comprises:
a processor, and
a non-transitory computer-readable storage medium storing programming instructions that, when executed, cause the processor to:
obtain a command from a server, parse the command to obtain an application package name, a new icon path and a text description on a new icon;
create a new icon according to the new icon path and the text description;
use the new icon created to create a startup icon of an application corresponding to the application package name on a home screen; and
alternately replace the startup icon to achieve a function of regularly flipping a tile.

11. The terminal of claim 10, wherein:
the programming instructions further cause the processor to:
receive a command from the server through a message pushing; or
send a request message to the server, and receive a command returned by the server according to the request message.

12. The terminal of claim 10, wherein:
the programming instructions further cause the processor to:
directly create a new icon according to the new icon path; or
obtain a new icon according to the new icon path, convert the new icon into a bitmap format, and add the text description on the icon converted into the bitmap format; or
remotely download a new icon according to the new icon path, save the new icon as a local picture and convert the local picture into a bitmap format, and add the text description on the icon converted into the bitmap format.

13. The terminal of claim 12, wherein:
the programming instructions further cause the processor to: use the new icon in the bitmap format to replace the startup icon of the application corresponding to the application package name or the application of itself.

14. The terminal of claim 13, wherein:
the programming instructions further cause the processor to: execute the operation of alternately replacing the startup icon by creating a timed task to simulate the flipping of front and back icons of the tile.

15. The terminal of claim 10, wherein:
the terminal is an Android-system terminal.

16. The terminal of claim 10,
wherein the command carries an application package name corresponding to an icon to be replaced, a new icon path and a text description on a new icon.

17. The terminal of claim 12, wherein the programming instructions further cause the processor to:
receive a command from the server through a message pushing; or
send a request message to the server, and receive the command returned by the server according to the request message.

18. The terminal of claim 16, wherein:
the terminal is an Android-system terminal.

* * * * *